C. W. KNOPF & C. R. BURRIER.
MACHINE FOR UNITING MATERIALS ADHESIVELY.
APPLICATION FILED FEB. 28, 1912.
1,097,864.
Patented May 26, 1914.
4 SHEETS—SHEET 1.
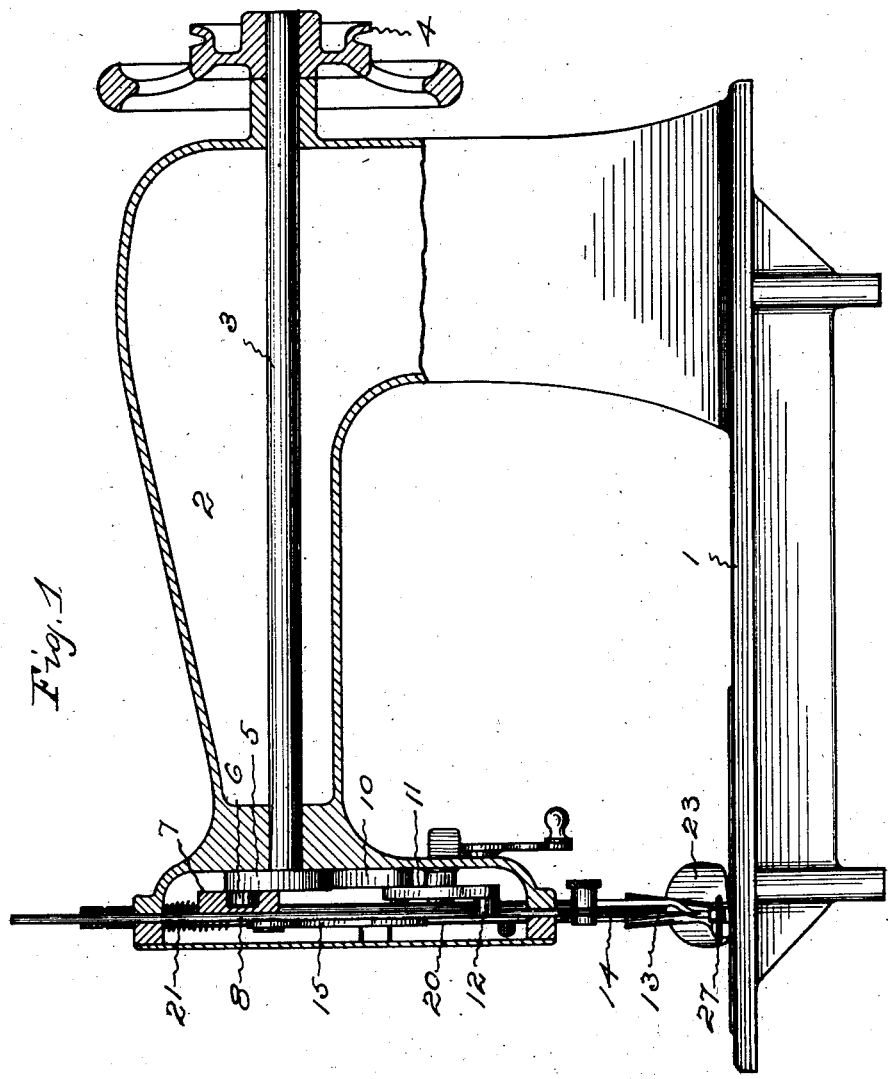

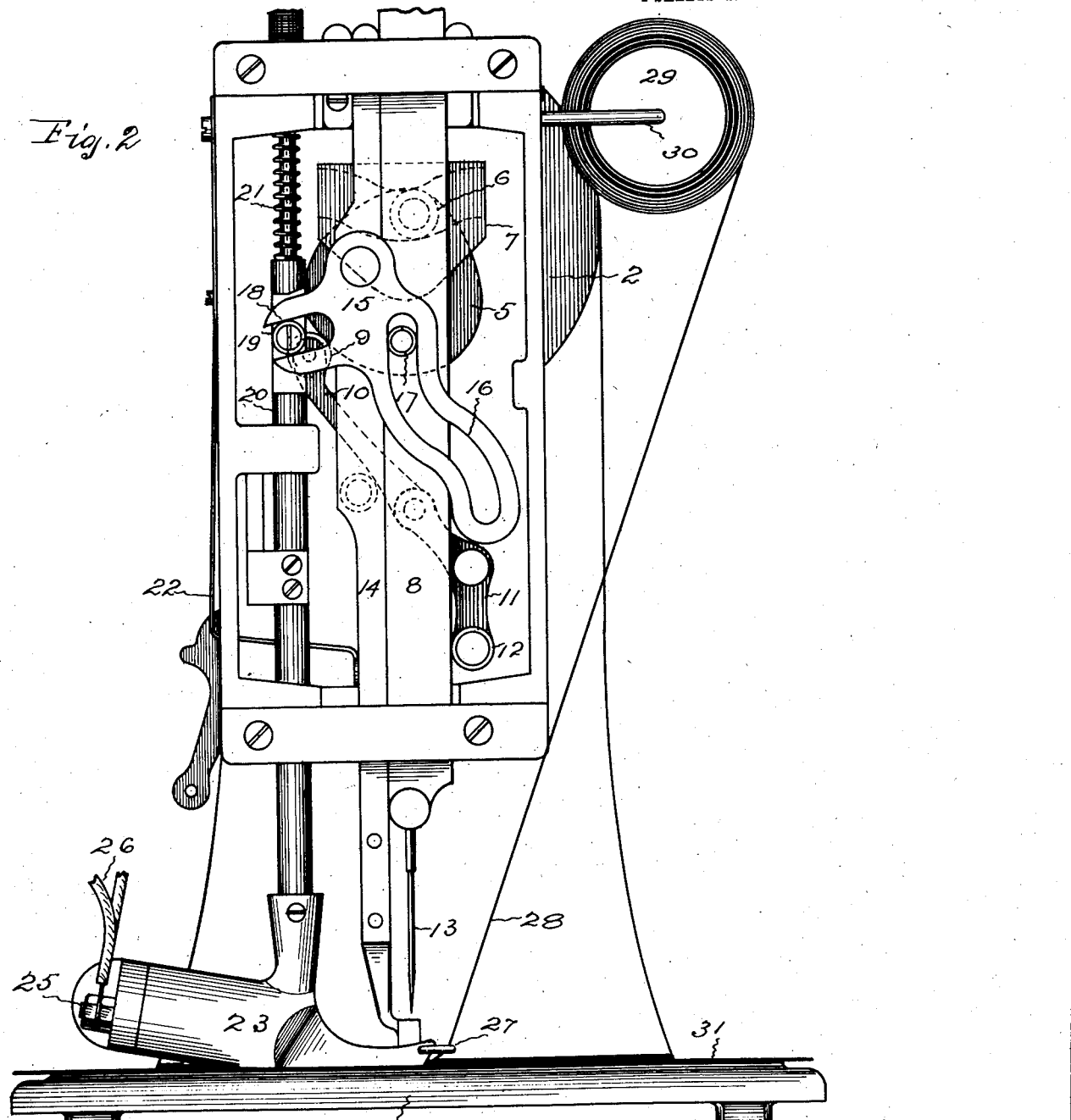

C. W. KNOPF & C. R. BURRIER.
MACHINE FOR UNITING MATERIALS ADHESIVELY.
APPLICATION FILED FEB. 28, 1912.
1,097,864.
Patented May 26, 1914.
4 SHEETS—SHEET 3.
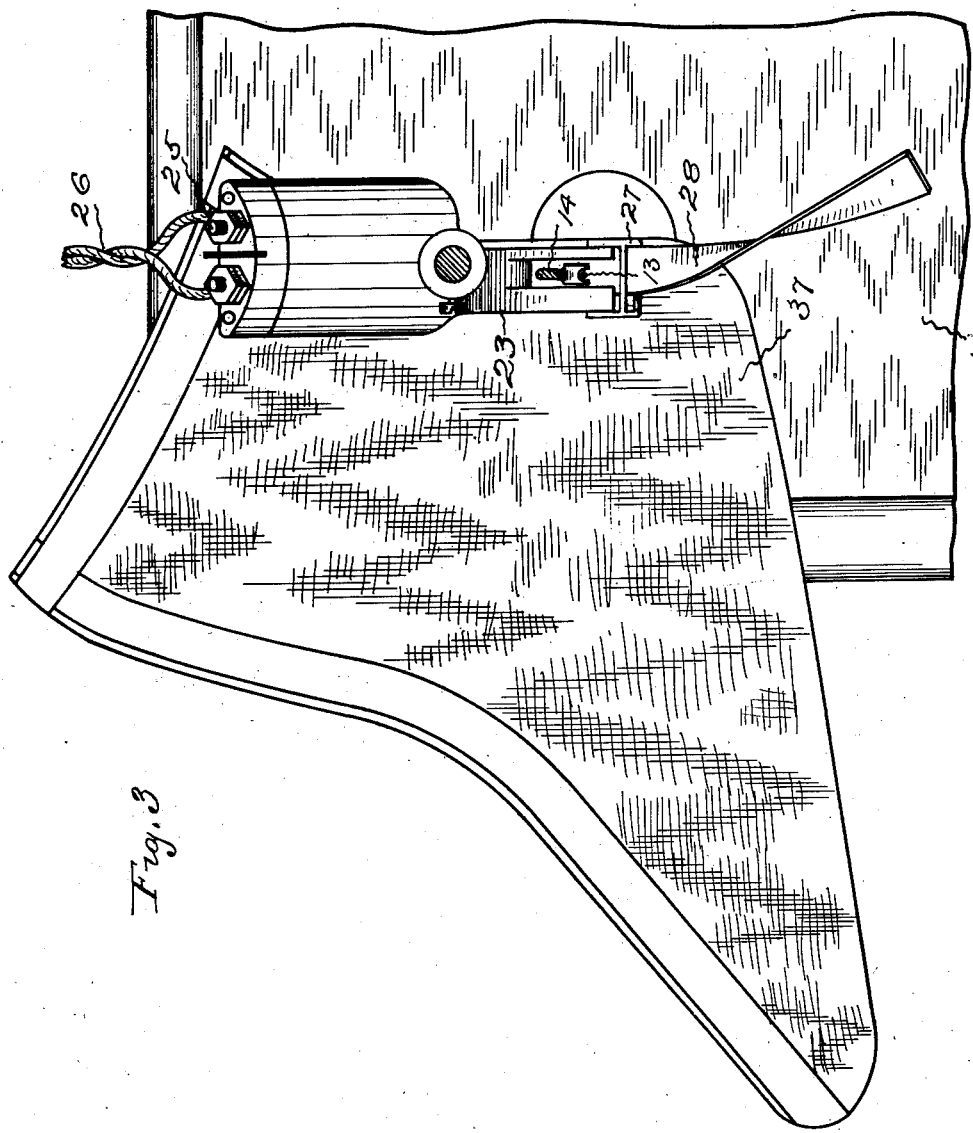

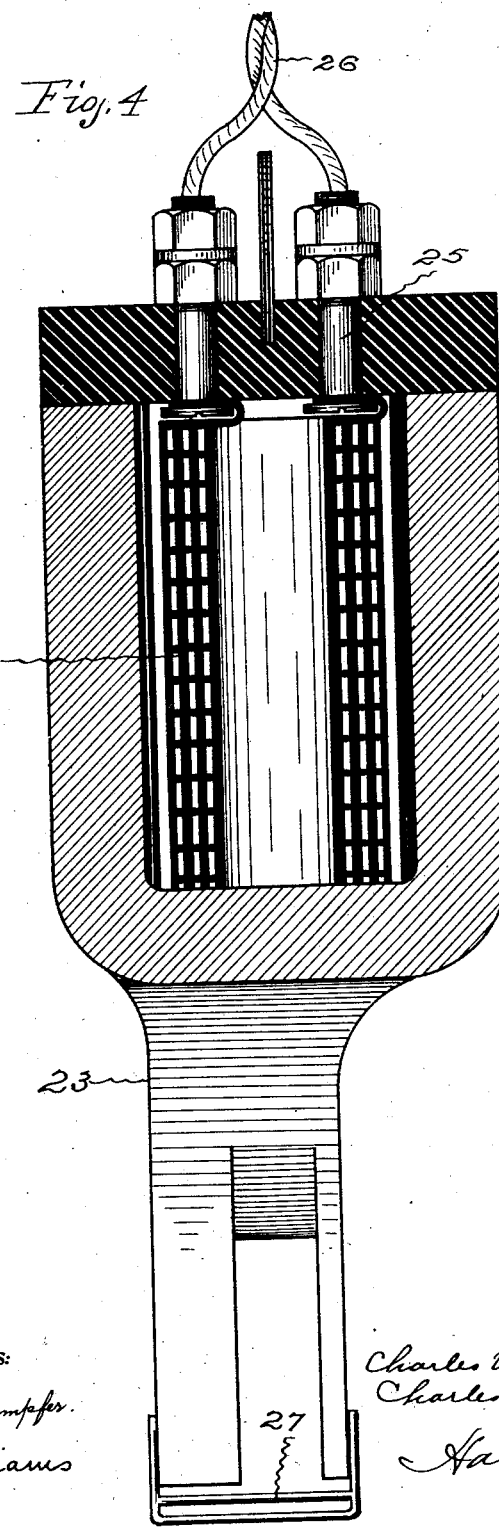

UNITED STATES PATENT OFFICE.

CHARLES W. KNOPF AND CHARLES R. BURRIER, OF PHILADELPHIA, PENNSYLVANIA, ASSIGNORS TO THE DAVIS SEWING MACHINE COMPANY, OF DAYTON, OHIO, A CORPORATION OF OHIO.

MACHINE FOR UNITING MATERIALS ADHESIVELY.

1,097,864.  Specification of Letters Patent.  Patented May 26, 1914.

Application filed February 28, 1912. Serial No. 680,504.

*To all whom it may concern:*

Be it known that we, CHARLES W. KNOPF and CHARLES R. BURRIER, citizens of the United States, residing at Philadelphia, in the county of Philadelphia and State of Pennsylvania, have invented a new and useful Improvement in Machines for Uniting Materials Adhesively, of which the following is a specification.

This invention relates to a machine which is designed to cause the adhesion of one material to another.

Many materials when being made up and when put to use are subjected to such strains that they stretch and become misshaped and the seams pull out if substantial inelastic staying means are not provided to prevent this. For instance, in the manufacture of the cloth or soft leather tops of certain classes of ladies' shoes, also in the manufacture of gloves, and in making up many other articles of wearing apparel, it is customary in order to prevent the articles from stretching out of shape and to strengthen the material at the seams, to apply strips of non-elastic tape to the elastic fabric or leather from which the articles are made. This has been effectively accomplished by applying a strip of adhesive tape adjacent to the edges and seams and causing the adhesion of the tape to the fabric or leather by passing a hot iron over the tape. The heat of the iron softens the adhesive compound and the pressure causes the plies to adhere. This however has been a somewhat expensive operation on account of the labor required.

The object of the present invention is to provide a machine which is so constructed that the body fabric or leather and a strip of staying material, either one or the other having been treated with adhesive material, or with a strip of adhesive material placed between such, can be easily fed into the machine and run through very rapidly in such manner that the adhesive is softened and the proper pressure applied to cause a firm adhesion between the elastic or stretchable fabric or leather, and the inelastic or staying strip. This object is attained by providing a machine with mechanisms which will feed the materials together beneath a heated hammer or presser. This heated hammer or presser is rapidly vibrated or reciprocated to impart the necessary pressure and to permit the proper feeding of the material, and it may be heated by steam, hot water, gas, or electricity, preferably the last, to raise it to the necessary temperature to soften the adhesive compound.

Figure 1 of the accompanying drawings shows a vertical section of a suggested form of machine which embodies the invention. Fig. 2 shows, on larger scale, a view looking at the front of the head of this machine. Fig. 3 shows a plan of the vibrating hammer or presser which is contemplated for use with the form of machine that is illustrated, in the act of applying a strip of adhesive tape to a piece of fabric cut to the shape of a portion of the top of a lady's cloth shoe. Fig. 4 shows on still larger scale a section of the hammer or presser which is provided for the machine illustrated, and is designed to be electrically heated.

The machine shown has a bed plate 1 and a horn 2 that projects over the bed plate. The bed plate and horn may be made of any size, shape and material that is desired. Supported by the horn is a horizontal shaft 3. On one end of the shaft is a driving wheel 4, which may be geared or belted, preferably the latter, for rotating the shaft. On the other end of the shaft is a cam 5 bearing a cam roller 6. This roller runs in a groove in the cam plate 7 and imparts a vertical reciprocation to the awl-bar 8 that is loosely held by the head of the horn. Engaging the edge of the cam is a roller 9 on the end of a lever 10 which is jointed to the end of a bell-crank 11 that is mounted in the head. On the lower end of the bell-crank is a roller 12 which engages the edge of the awl-bar for causing it to swing horizontally as it is given its vertical reciprocation. Clamped in the lower end of the awl-bar in the form of machine illustrated is a needle 13. This needle is not used for stitching, but as an awl or device for piercing the plies of material and holding them together so that one will not slip with relation to the other and neither will stretch when being fed through the machine.

Supported by the head at the side of the awl-bar is a vertically movable feed-bar 14. Pivoted on this feed-bar is a link 15, which has a cam slot 16 in which is a roller 17 that is carried by the awl-bar. This link also has a fork 18 which embraces a roller 19 on the presser-bar 20. The presser-bar is normally forced down by a spring 21. As the awl-bar is reciprocated, the link raises and lowers the feed-bar and the presser-bar alternately. The awl-bar and the feed-bar, when at their lowest position, are swung forward so as to feed the plies of material. At this time the presser-bar is raised and when the awl-bar and feed-bar are lifted the presser-bar is forced down. When the awl-bar and feed-bar are raised to their highest position, they are swung back by a spring 22 which presses against the feed-bar. At this time the presser-bar is down holding the materials. The specific details of these mechanisms and their co-action are not further described, as they are well known to those skilled in the sewing machine art, although this invention does not relate to a sewing machine.

In this machine to accomplish the object of this invention, attached to the lower end of the presser-bar is a hammer or presser-foot 23. This presser, which is vibrated rapidly up and down when the machine is in operation is heated by any suitable means. For the purpose of illustrating a preferred form of the invention, this presser is shown as provided with an electric heater. In the hollow body of the presser, which is desirably made of copper, brass, or any other good heat conducting metal is placed an electrical resistance or heating coil 24. Connected with the terminals of this heating coil are the terminal posts 25 to which the ends of the circuit wires 26 may be fastened. These circuit wires can be ordinary flexible cords, and they may be arranged to be connected with any suitable source of electric current, whereby when the machine is in operation the vibrating presser will be electrically heated. On the front end of the presser is a guide 27 through which a tape 28 may be led from a roll 29 mounted on a suitable support 30 attached to the head.

When this machine is to be used to apply a strip of adhesive non-stretching tape to such a fabric as the cloth top of a lady's shoe, the free end of the tape 28 is threaded through the guide, and then the elastic fabric 31 to be stayed, with the staying tape on it, is started on top of the bed beneath the hot presser, and the machine set running. The awl pierces the tape and fabric, and the feed-bar presses down upon the tape. The presser at this time is lifted. While the presser is lifted, the awl and the feed-bar are swung forward to feed the material. Both plies are fed together—one cannot slip with relation to the other because they are both pierced by the awl. After the plies have been fed the presser strikes down, and bearing heavily on the tape presses it closely against the body material, and being hot softens the adhesive compound and causes the fabrics to stick together. When the presser is down, and the awl-bar and feed-bar are raised, the latter are swung backward for effecting the next movement. By passing the materials between the solid bed and the rapidly vibrating heated presser, the two or more plies are advanced without stretching, because at the time of feed the vibrating presser is raised and both plies are under the control of the awl or similar instrument which pierces them and holds them together as the feed-bar carries them forward. As the presser is quite hot and vibrates rapidly, and as there is an extended area of heated surface which comes in contact with the tape each time the presser comes down, every portion of the tape is given many blows and pressed firmly against the body material by the hot presser many times while it is passing between the vibrating presser and the top of the bed. Thus sufficient heat is imparted to soften the adhesive material, and enough pressure is applied to cause the tape to adhere firmly throughout its entire length.

The invention is not limited to the specific mechanisms shown, although the mechanisms illustrated are well suited to the purpose.

The invention claimed is:

1. In a machine for causing the adhesion of plies of material, the combination of a bed plate, a presser, mechanism for vibrating the presser against the plies on the bed plate, electrical resistance means located within the presser for heating and softening the adhesive while the plies are being subjected to and united by the blows of the presser, and means for feeding the plies uniformly over the bed and beneath the presser.

2. In a machine for causing the adhesion of plies of material, the combination of a bed plate, a presser, mechanism for vibrating the presser against the plies on the bed plate, means for heating and softening the adhesive while the plies are being subjected to and united by the blows of the presser, and mechanism for feeding the plies beneath the presser when the presser is away from the plies.

3. In a machine for causing the adhesion of plies of material, the combination of a bed plate, a presser, mechanism for vibrating the presser against the plies on the bed plate, means for heating and softening the adhesive while the plies are being subjected to and united by the blows of the presser, and mechanism for holding the plies together and feeding them in unison beneath the presser when the presser is away from the plies.

4. In a machine for causing the adhesion of materials, the combination of a presser, means for heating the presser, mechanism for vibrating the presser against the plies to be united, mechanism for feeding the materials, and mechanism for holding the plies so that one will not be stretched with relation to the other while they are being fed.

5. In a machine for causing the adhesion of materials, the combination of a bed, a presser movable toward and from the bed, electrical resistance and current connecting means carried by the presser for heating the same, mechanism for rapidly vibrating the presser toward and from the bed and against the plies to be united, and mechanism for feeding the materials between the bed and the vibratory presser.

6. A machine for causing the adhesion of materials having a bed, a presser adapted to be vibrated toward and from the bed for rapidly imparting blows to the materials fed between the bed and presser, means independent of the bed and presser for feeding the materials between the bed and the presser, and means carried by the presser for heating the presser.

7. In a machine for causing the adhesion of plies of material, the combination of a bed plate, a presser, mechanism for vibrating the presser against the plies on the bed plate for uniting the same, and means located within the presser for electrically heating the same.

CHARLES W. KNOPF.
CHARLES R. BURRIER.

Witnesses:
RALPH E. KNOPF,
WM. H. MACMUNN.